March 9, 1926.

T. WELSAND 1,576,017

CANDY MOLDING MACHINE

Original Filed April 18, 1921    5 Sheets-Sheet 2

Inventor
Theodore Welsand
by Otto M. Wernich
Atty.

March 9, 1926.

T. WELSAND

CANDY MOLDING MACHINE

Original Filed April 18, 1921    5 Sheets-Sheet 3

1,576,017

Inventor
Theodore Welsand
by Otto M. Wernich Atty.

March 9, 1926.

T. WELSAND

CANDY MOLDING MACHINE

Original Filed April 18, 1921 5 Sheets-Sheet 4

1,576,017

Inventor
Theodore Welsand
by Otto M. Wernich
Atty.

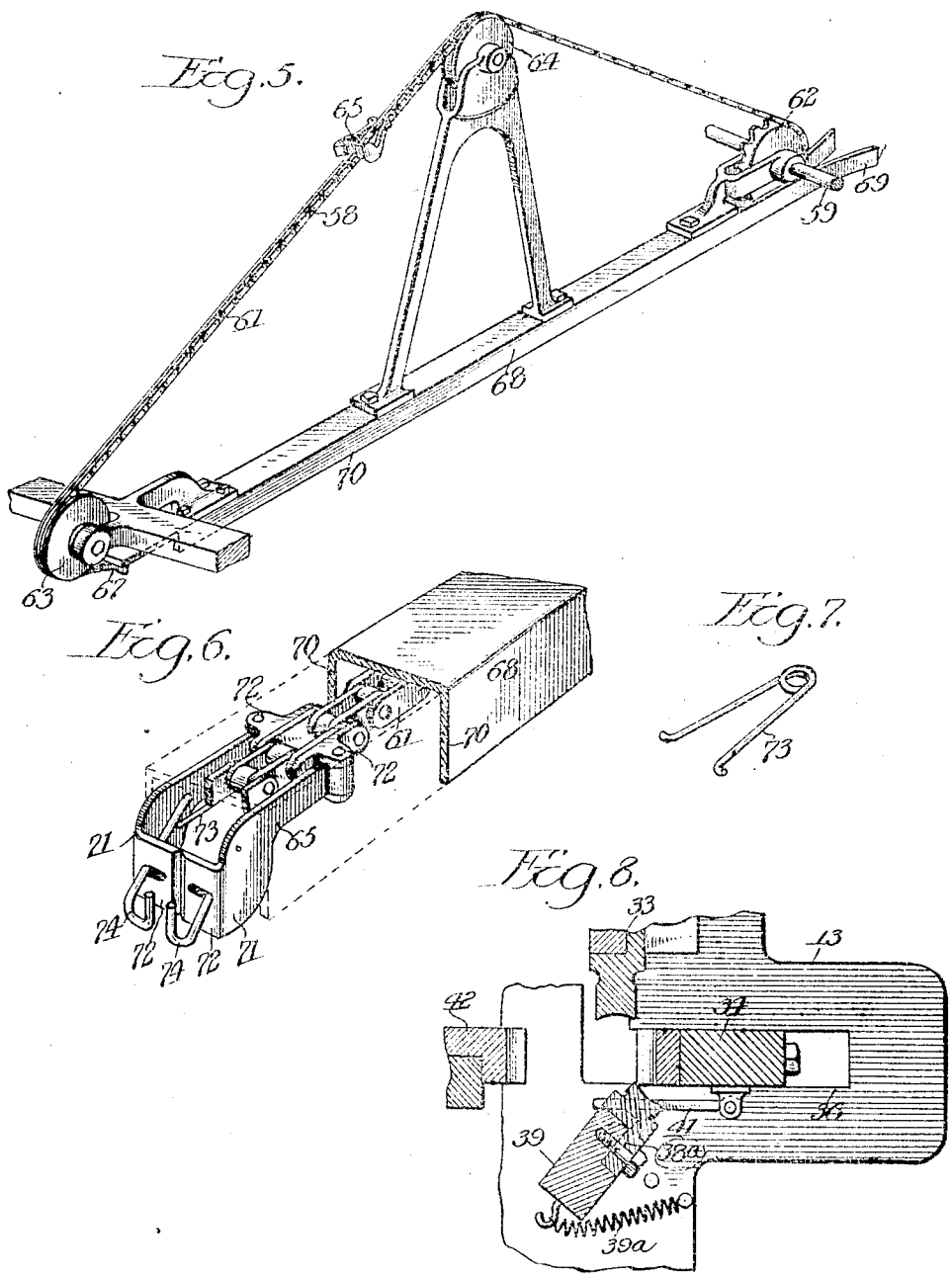

Patented Mar. 9, 1926.

1,576,017

UNITED STATES PATENT OFFICE.

THEODORE WELSAND, OF CHICAGO, ILLINOIS, ASSIGNOR TO VACUUM CANDY MACHINERY CO., OF WAUKEGAN, ILLINOIS, A CORPORATION OF ILLINOIS.

CANDY-MOLDING MACHINE.

Application filed April 18, 1921, Serial No. 462,295. Renewed July 27, 1925.

*To all whom it may concern:*

Be it known that I, THEODORE WELSAND, a citizen of Poland, residing at Chicago, in the county of Cook and State of Illinois, have invented a certain new and useful Improvement in Candy-Molding Machines, of which the following is a full, clear, concise, and exact description, reference being had to the accompanying drawings, forming a part of this specification.

This invention relates to candy molding machines and is primarily designed to provide a simple and efficient structure for acting upon or pressing the confection into any desired shape or form so that it will simulate various fruits or other objects.

The invention has among its various objects the provision of a mechanism in which the commodity or confection which is to be molded into the desired shape will be continuously fed into this machine, shaped or formed and ejected therefrom in the shape or form desired. In addition the invention has as an object the provision of an arrangement or mechanism capable of performing the functions which will materially reduce the cost of producing the article and which will increase the output or production, and in addition will accomplish these results with less manual labor than other machines of the same nature.

It is a further object of the invention to provide a mechanism which will compensate for bars or rolls of the confection, should the same be of a larger circumferential or transverse dimension than the machine will ordinarily accommodate, and thereby prevent breakage of the parts should this condition at any time exist.

The arrangement is particularly adaptable for use in connection with what is generally known in the candy making art as a spinner, which ejects the confection in the shape of a bar or roll. This bar or roll is grasped at one end and drawn through the machine to the proper position and is then released, when the bar or roll reaches this position, it is severed intermediate its ends from that part which projects from the spinner. This latter portion is simultaneously grasped so that another portion may be drawn through the machine and positioned to be actuated upon thereby.

In the embodiment of the invention herein shown and described, the use of a conveyor is contemplated which is provided with grasping means and cutters which grasp the confection at one end and convey and position it so that it may be operated upon to mold it into the desired shape or form. When one end of the confection which is usually in the form of a roll or bar is properly arranged in the machine the bar is severed and the end from which the severed portion has been cut, is grasped so that it may subsequently be drawn through the machine and placed so that it may be operated upon to produce a confection of the desired shape.

The present embodiment of the invention contemplates a pair of molding devices which are arranged so that during the period that one is performing the molding operation the other is ejecting the confection in its molded form and being positioned to accommodate or receive another portion of the confection as it is introduced into the machine by the conveyor. Thus the machine will be constantly ejecting the finished product and receiving the material from which the commodity is to be formed, thereby increasing the output, and reducing the cost of production.

The invention will be explained in detail and more readily understood when read in conjunction with the accompanying drawings which illustrate one embodiment of which the invention is susceptible, it being understood however that various changes and modifications may be resorted to without departing from the spirit of the appended claims forming a part hereof.

Figure 5 is a detail of a conveyor machine.

Figure 6 is a perspective of the cutters and grippers which are associated with the conveyor shown in Figure 6.

Figure 7 is a detail perspective of the spring used in the structure shown in Figure 6.

Figure 8 is a section of a portion of the machine showing the molding dies in a changed position.

Figure 1:
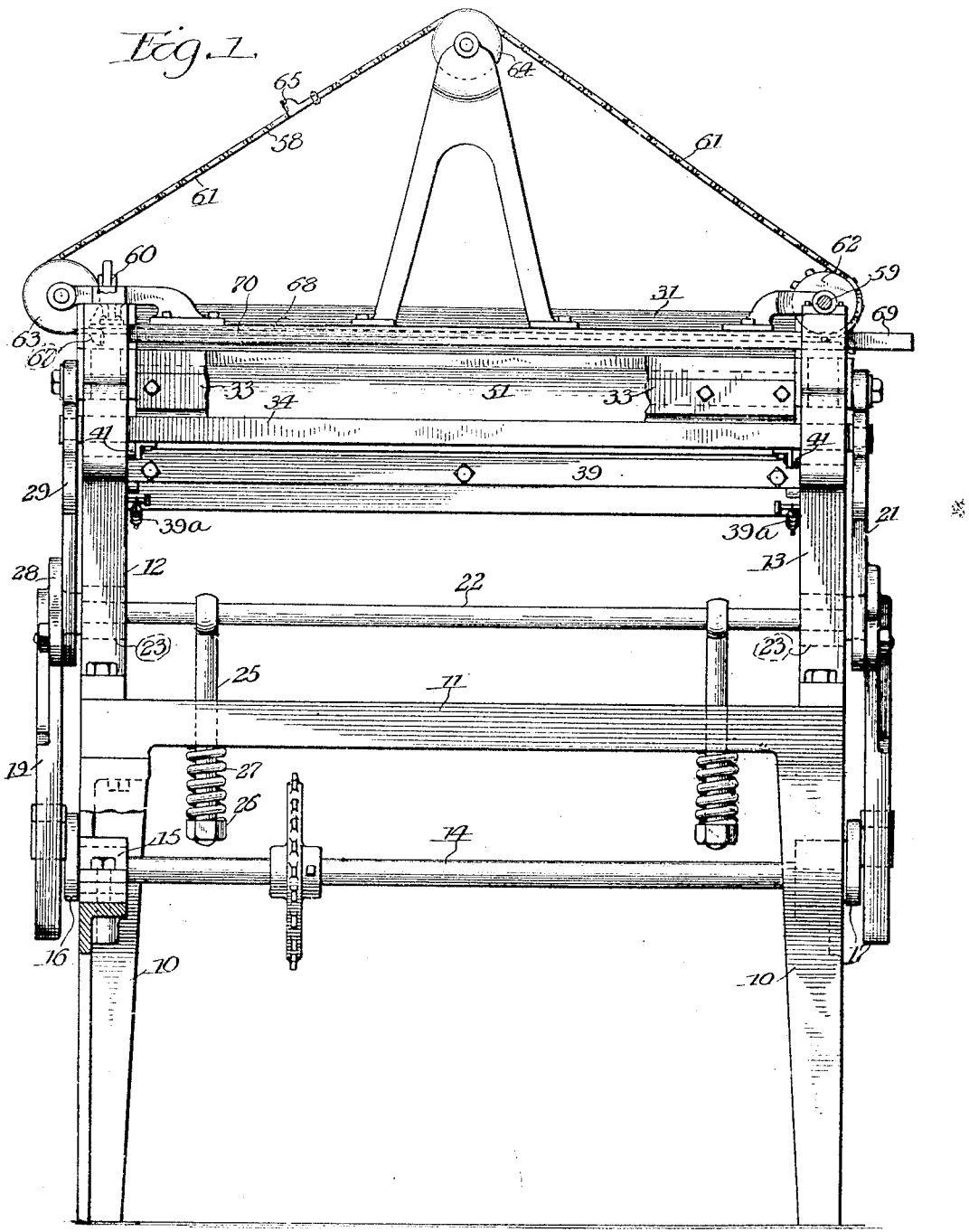
Figure 1 is a side elevation of a machine constructed according to one embodiment of the invention.
Figure 2:
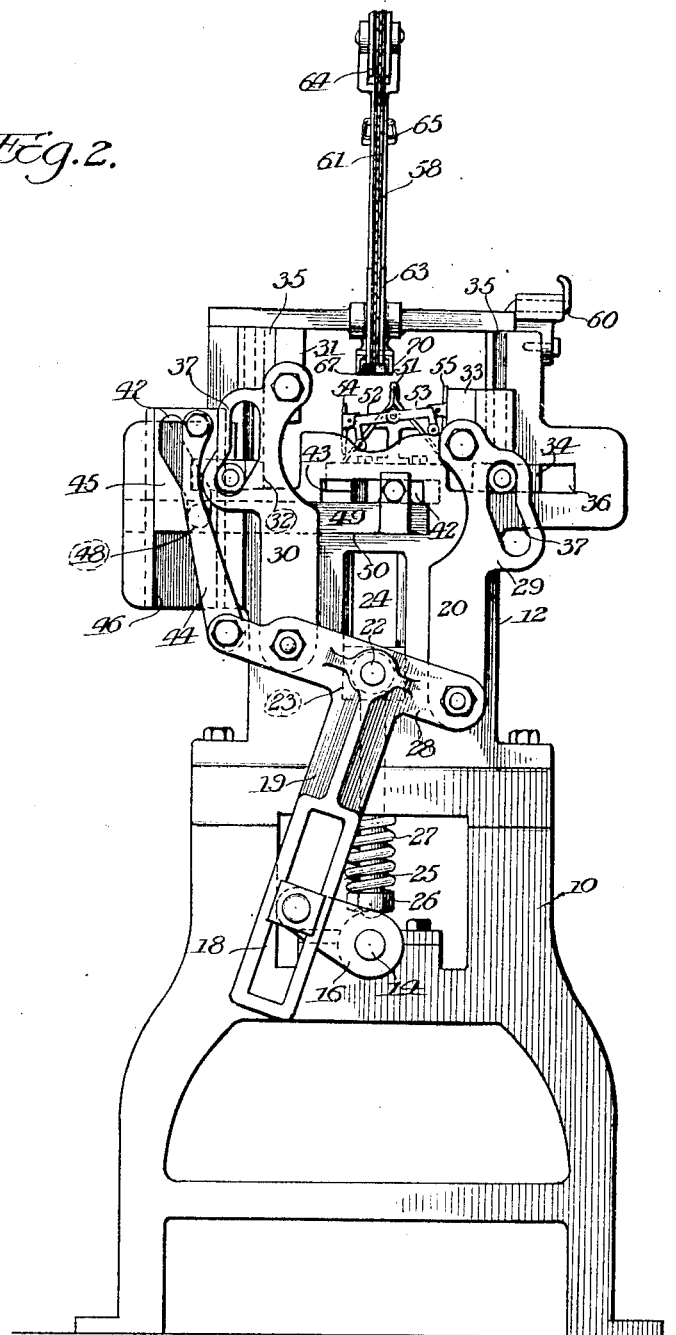
Figure 2 is an end elevation of the structure shown in Figure 1.
Figure 3:
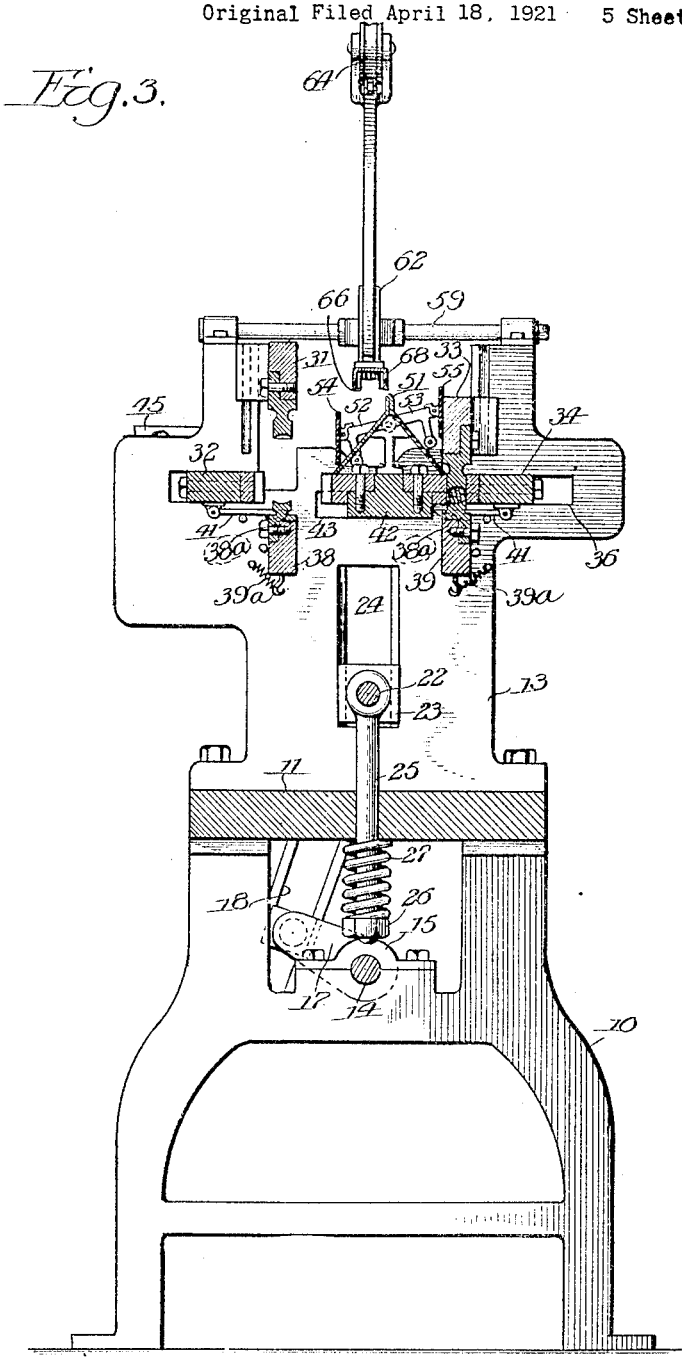
Figure 3 is a section taken on line 3—3 of Figure 1.
Figure 4:
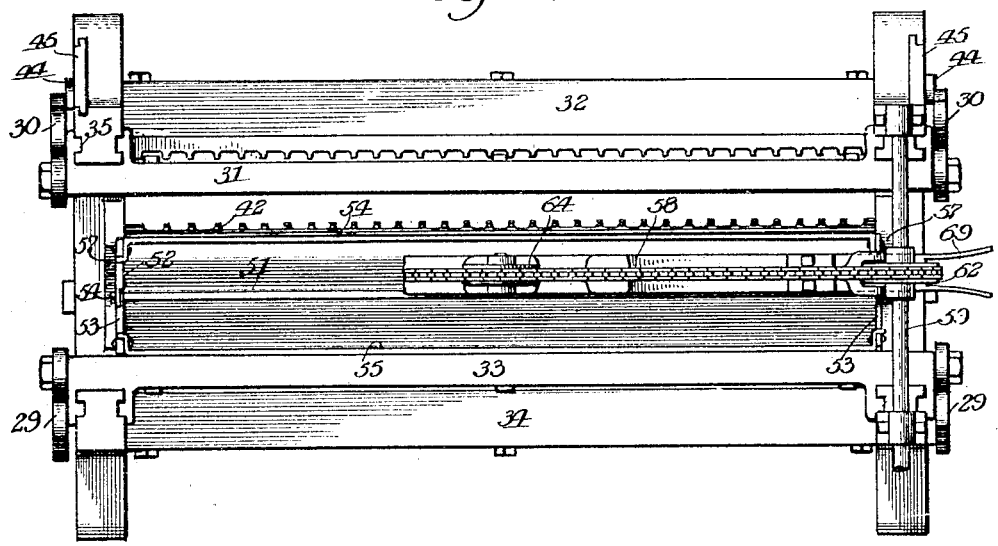
Figure 4 is a top plan view.
Figure 9:
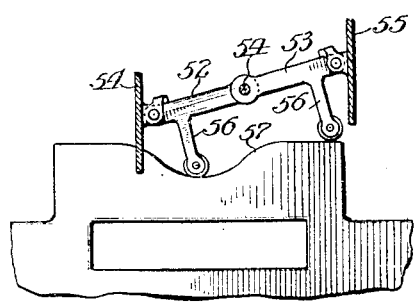

And Figure 9 is a detail of a part utilized in the machine.

In the specific structure employed in the construction illustrated in the drawings the mechanism is supported by means of the frames or supports 10—10 which are connected together by means of the plate 11 to which the standards or supports 12 and 13 are secured. These supports carry the dies which press the commodity into shape and also provide supports for certain of the die actuating mechanism and in addition support a conveyor mechanism provided for feeding the material to the machine. A drive shaft 14 is employed which is supported in journal boxes 15—15 which are mounted or carried by the frames 10—10. This shaft may be driven in any suitable manner and has its opposite ends provided with crank arms 16 and 17 which have extensions which are arranged in boxes and slide in a slot 18 provided in each of the arms 19, the latter being connected to the mechanism 20 and 21 arranged at the opposite ends of the machine. This mechanism 20 and 21 is provided for actuating the dies whereby the commodity is pressed into form, and, as the mechanism at one end of the machine is identical with that arrangement at the other an explanation of the structure and operation of one will suffice for an understanding of both.

These arms 19—19 are pivoted upon a rod 22 supported in journal boxes 23—23 arranged in the vertical slots 24 provided in the supports 12 and 13. This rod and its associated mechanism is resiliently held in its lowermost position by means of the transversely arranged rods 25—25 which are secured at one end to the rod 22 and pass through the plate 11, and are each provided with a nut 26 and a spring 27 which reacts between the plate and the nut and acts to hold the rod in its lowermost position in the slot, yet will allow said rod and its associated mechanism to yield when necessary. The uppermost ends of the arms 19 are provided with a transversely arranged portion 28, and the respective ends of this last named portion has a cam arm 29 and 30 pivotally secured thereto. These cam arms have a vertical reciprocable motion imparted to them upon the actuation of the arms 19 and are operated alternately, that is one will be raised during the period that the other is lowered, consequently any mechanism connected thereto will also be alternately operated. These cam arms are provided to actuate suitably arranged bars to which dies are removably attached. In the structure illustrated there are two sets of these bars, one set being operated by one set of cam arms and the other by the other and as these cam arms are operated alternately one set of bars will be actuated to act upon the commodity while the other is ejecting the finished product and being positioned to receive another roll or bar of the confection. The bars above referred to of one set are designated by the numerals 31 and 32, similar bars of another set are defined by the numerals 33 and 34. The bars 31 and 33 are secured to the uppermost ends of the cam arms and operated along guideways 35—35. The other bars as 32 and 34 are arranged in horizontal slots such as 36. The ends of these last mentioned bars project through and into the cam slots 37 provided in each cam arm. These slots are constructed so as to impart a horizontal reciprocal motion to the bars, as the cam arms are moved vertically. From this it can be seen that the bars which carry the dies will be moved towards and away from each other upon each action of the cam arms. Each set of these bars includes the bar 38 and 39 arranged directly below the bars 31 and 33, these last mentioned bars have only a rocking motion imparted to them so that they can be arranged to assist in forming the confection and to eject it after it has been formed. To accomplish this, this bar is pivoted in the supports 12 and 13, at 38$^a$ and these supports are provided with limiting pins which prevent the movement of this bar in one direction but allow the same to be moved in the opposite direction when engaged by the pawl 41. These bars are restored to their normal or operative position by means of the coil spring 39$^a$. This pawl is pivoted to the bars such as 32 and 34 and is provided to engage the projections such as 41$^a$ provided upon the upper face of the bars such as 38 and 39 to tilt the bars such as 38 and 39 when the former are moved outwardly. Another bar 42 is utilized which also has a horizontal reciprocable motion so that it may be moved with relation to the feeding mechanism to permit the roll or bar of confection to be alternately arranged upon opposite sides thereof. This bar is arranged in substantially horizontal alignment with the horizontally reciprocable bars 32 and 34. This bar 42 acts as a rest for the material while it is being fed to the machine by the conveyor and also has a die secured to it which cooperates with the dies provided upon the other bars, to press or form the material into the desired shape. This bar is of a width sufficient to allow the material to be placed upon one side of the center thereof while this bar is cooperating with one set of bars or dies so that when this bar is moved to allow the finished product to be ejected from between this last mentioned set of bars, the bar or roll of confection, previously arranged upon the bar 42, may be arranged between the other set of bars, so that these may act upon the roll or bar to form it into the desired shape. When the bar 42 is in this last named position another bar or roll of confection will be arranged upon the opposite side of the center thereof. This action is continued throughout the whole time that the machine is in operation. This bar 42 is arranged in the horizontal slot 43 and is actuated by virtue of a connection with the swinging arms 19—19. This connection in the present structure includes the link 44 one end of which is connected to the transverse portion of the arm 19 and has its opposite end pivotally connected with a sliding block 45 arranged in a vertical guideway provided in the supports 12 and 13. This block is provided with a cam slot 47, and through the medium of the pin 48 which is arranged in this slot and connected to the reciprocable bar 49 causes the reciprocation of the bar 42. The bar 49 is arranged in a horizontal groove 50 and has one end connected to the bar 42. The dies may be connected to the bars such as 42 in any suitable manner. This horizontally reciprocable bar 42 has the longitudinally extending gable shaped rib 51 secured to it with which is cooperatively arranged an arrangement for releasably holding the bar or roll of confection with relation to this rib. This holding mechanism is provided to hold the confection with relation to the rib during a portion of its travel towards one or the other of the sets of forming dies or bars and is actuated to release the confection to allow it to enter between said dies. This last mentioned mechanism includes the arms 52 and 53 which are pivoted at 54, and respectively carry the movable gates 54 and 55, at their opposite ends. These arms are also provided with the transversely arranged extensions 56, which are provided with antifriction rollers which ride upon the cam track 57 one of which is arranged at each end of the machine and is so designed that it will alternately raise and lower said gates to retain and release the roll or bar of confection from the rib 51.

A conveyor generally designated 68 is utilized for conveying the bar or roll of confection from the spinner to the machine. This conveyor is pivoted at 59 to one of the supports such as 13 and is provided with a lock 60 for releasably locking this portion to the remainder of the device. This conveyor extends from one end of the machine to the other and is arranged directly in the center thereof between both sets of bars which carry the forming dies, and includes an endless link chain 61 which is driven by the sprocket wheel 62 and travels over idlers 63 and 64. This chain has secured to it a plurality of grippers 65, 66 and 67, which are operated to close upon the bar and be held in this condition and to also release the bar when they reach various positions in the track 68. In addition to grasping and conveying the material through the machine, this mechanism also cuts or severs the part to be acted upon by the machine from the part ejected by the spinner and in addition also grips this last mentioned part so that it may be subsequently drawn through or arranged in the machine by the conveyor. The track 68 is provided with the flared end 69 and the substantially parallel side walls 70 which terminate adjacent one end of the machine. The flared portion is provided to engage the cutters and grippers and close them and the opposite end is provided to allow the cutters and grippers to open and release the bar or roll of confection. These grippers and cutters are pivotally connected to the chain, and include a pair of elements 71, which are pivotally secured to the outer side of the conveyor chain, by means of the lugs or brackets 72. These elements 71 are each provided with the inwardly projecting portions 72 which are arranged so that they will pass below the chain, and are provided to cut or sever the bar or roll of confection. To facilitate this cutting action these inwardly projecting portions are provided with cutting edges so that the roll or bar of confection will be severed when these portions are brought together by the cam track 69. An expansion spring 73 is utilized for separating these hinged members after they have passed beyond the influence of the cam track. These hinged elements 65 are further provided with gripper fingers 74 which grip the main portion of the bar of confection simultaneously with the cutting action, and therefore one piece is severed and the next or succeeding portion is grasped so that it may be drawn through the machine.

These grippers and cutters are arranged in such relation upon the chain, so that one gripper will be releasing the confection approximately at the same time that the cutter of the succeeding one is severing this portion from the main bar or roll, and gripping the end of this main portion, so that the bar or roll may again be drawn through the machine.

The operation of the machine is substantially as follows: The conveyor chain is caused to travel around the wheels 63 and 64 and grip, convey, cut and grip again and release the bar of confection. As the bar of confection is drawn through the machine, the horizontally movable bar 42 is positioned so that the confection will be arranged at one side or the other of the rib 51 secured to and arranged to extend lengthwise and centrally of the bar 42. Thus as this bar is moved from one side to the other, a portion of the bar or roll of confection will be alternately arranged upon opposite sides of this rib, as it is fed to the machine by the conveyor. This rib may have the inclined sides as shown so that the confection will roll against the gates and to the forming dies when released by the conveyor and the gates, thus as the confection is alternately arranged upon opposite sides of the rib, the forming dies will alternately have the confection fed thereto. The bars which have the dies secured thereto are then actuated to press the material into the desired shape, after which the confection will be ejected outwardly away from the center of the machine first from one side and then the other. As before stated provision is made whereby either set of forming dies or bars which carry these may yield in the event that a bar of relatively large dimension should be fed to the other.

To compensate for this contingency the shaft 22 is yieldably held in the slot 24 by means of the rods 25 and the spring 27, this arrangement allows the shaft and its associated parts to move without resulting in any injury thereto. To drive the conveyor chain, a sprocket or other arrangement may be secured to the shaft 59 the latter also acts as a pivot for the channel bar 68 and its associated parts so that this may be lifted to permit access to other parts of the machine which are arranged below it.

Having thus described the invention what I claim and desire to secure by Letters Patent is:

1. In a candy molding machine the combination of candy molding devices means for continuously feeding candy to the molding device, said means including an endless flexible element having grasping and severing devices arranged thereon, said grasping device being operable to grasp the candy and convey it into the machine and to release said candy after being arranged therein.

2. In a candy molding machine the combination of candy molding devices, means for continuously feeding candy to the molding devices, said means including an endless flexible element and grasping and releasing devices which grasp and convey the candy through the machine and release said candy when the latter is arranged therein.

3. In a candy molding machine the combination of a pair of candy molding devices, an endless conveyor for continuously feeding candy to the molding devices said conveyor being arranged between said molding devices and means for controlling the introduction of said candy to the molding devices and said molding devices being reciprocable below said conveyor.

4. In a candy molding machine the combination of a pair of molding devices, a member arranged to reciprocate between said molding devices, a feeding device arranged to feed candy to said member, said feeding device including a flexible element adapted to travel between said pair of molding devices and to deposit the candy to be molded upon opposite sides of the reciprocable member, means for controlling the introduction of the candy into said molding devices from said reciprocable member, said means being operable upon the actuation of said reciprocable member.

5. In a candy molding machine the combination of a pair of candy molding devices, and an endless conveyor for continuously feeding candy to both of said molding devices said conveyor being arranged to extend lengthwise of the machine and being provided with grasping means which are operable to release the candy when the candy is positioned in said machine.

6. In a candy molding machine the combination of candy molding devices, means for continuously feeding candy to said molding devices, said feeding means including an endless flexible member having means for severing said candy to be molded and means for grasping the candy at an end to convey it to the molding devices.

7. In a candy molding machine the combination of candy molding devices, means for continuously feeding candy to said molding devices, said feeding means including an endless flexible element carrying means for grasping the candy at an end to introduce the same into said molding devices.

8. In a candy molding machine the combination of candy molding devices, means arranged between the molding devices for continuously feeding candy to the molding devices, said means including means for grasping and releasing the candy.

9. In a candy molding machine, the combination of a plurality of members providing a pair of molding devices, a member providing a support for the candy to be molded and having molding devices arranged to cooperate with said pair of molding devices, said member being arranged to move into engagement with one of said pair of molding devices to form the candy and to move out of engagement with the other of said pair of molding devices and permit the molded candy to be simultaneously ejected therefrom upon the molding operation of the other molding device, said member having means for controlling the introduction of the candy to said molding devices.

10. In a candy molding machine the combination of a plurality of molding devices, means arranged between the molding devices for alternately feeding candy to be molded to said devices, means for supplying candy to said first mentioned feeding means, and means for controlling the introduction of candy from said feeding means to the molding devices, said last mentioned means being movable with said first mentioned means.

11. In a candy molding machine the combination of a plurality of molding devices, a means for alternately feeding candy to be molded to said plurality of molding devices, means for supplying candy to the feeding means, means for controlling the feeding of said candy to the molding devices, said last mentioned means being reciprocable to opposite sides of the candy supplying means.

12. In a candy molding machine the combination of means for feeding candy to said machine a pair of molding devices, said molding devices being permitted to alternately receive said candy as it is fed to said machine and means including a portion of the molding devices for controlling the introduction of said candy to the molding devices.

13. In a candy molding machine the combination of a plurality of molding devices and means for feeding the candy to said devices, said molding devices including a portion which is movable relatively to the feeding means to control the introduction of the candy to said devices.

14. In a candy molding machine the combination of a plurality of molding devices feeding means and means operable to be alternately arranged upon opposite sides of the feeding means for controlling the introduction of candy to the respective molding devices, said molding devices including a molding element operable to eject the molded candy.

15. In a candy molding machine the combination of a pair of molding devices, means for feeding candy to be molded to said molding devices, said molding devices being arranged upon opposite sides of the feeding means, and said feeding means being movable upon the molding operation of one of the molding devices to receive candy to be deposited in the other molding device.

16. In a candy molding machine the combination of a plurality of members providing a pair of molding devices, a member having molding devices arranged to co-operate with said pair of molding devices, said member being arranged to move into engagement with one of said pair of molding devices to form the candy and to move out of engagement with the other of said pair of molding devices and an ejector for simultaneously ejecting the molded candy therefrom upon the molding operation of the other molding device.

17. In a candy molding machine the combination of a plurality of members providing a pair of molding devices, each of which include a plurality of radially movable converging elements, a member having molding devices arranged to co-operate with said pair of devices, said member being arranged to move into engagement with one of said pair of molding devices to form the candy and to move out of engagement with the other of said pair of molding devices and permit the molded candy to be simultaneously ejected therefrom upon the molding operation of the other molding device.

18. In a candy molding machine the combination of a pair of molding devices, including parallelly arranged converging movable members, means for feeding candy to the molding devices and reciprocable means arranged between the molding devices for alternately causing the candy to be fed to the molding devices.

19. In a candy molding machine the combination of a molding device, means for introducing the candy to be molded to said molding device and means for feeding candy to said first mentioned means, said first mentioned means having means which co-operates with the molding device to complete said mold.

20. In a candy molding machine the combination of a plurality of alternately operable molding devices, said molding devices having members which converge to engage the candy to mold the same into form and being operable to eject the molded candy therefrom and to be simultaneously positioned to receive the candy to be molded.

21. In a candy molding machine the combination of a plurality of molding devices, said molding devices having members operable to alternately open to receive the candy to be molded and closed to engage and mold said candy, and means whereby said molded candy is ejected when said molding devices are arranged to receive the candy to be molded, said last mentioned means being operable by one of said molding members.

22. In a candy molding machine the combination of a plurality of molding devices, said molding devices being operable to laterally open to receive the candy to be molded, closed to engage and mold the candy and to automatically eject said molded candy when arranged to receive the candy.

23. In a candy molding machine, the combination of a plurality of molding devices, including a plurality of horizontal and vertically movable converging dies which co-operate to form the candy into shape, said devices being operable to alternately open to receive the candy between said dies and closed to engage said candy, means for actuating said dies and a yieldable connection between said dies and actuating means.

24. In a candy molding machine the combination of a plurality of alternately operable molding devices, a reciprocable element arranged between the molding devices, said reciprocable element being arranged to provide a rest for the candy prior to its introduction to the molding devices and having a face which cooperates to mold the candy into form having means for feeding said candy by gravity to said molding devices.

25. In a candy molding machine the combination of means for molding the candy into form means for feeding a bar of candy thereto, and cam actuated means carried by the feeding means for severing the bar when said bar is arranged to be inserted between the molding device.

26. In a candy molding machine the combination of means for molding the candy into form, means movable lengthwise of the molding means for feeding a bar of candy thereto, said means including means for severing the bar and grasping that portion of the bar from which the former has been severed.

27. In a candy molding machine the combination of converging elements for molding candy into form, means for feeding candy thereto, said means including means movable lengthwise of the molding means for grasping and releasing said candy.

28. In a candy molding machine the combination of means for molding the candy into form, means movable lengthwise of the molding means for feeding candy in the form of a bar thereto, means for grasping said candy adjacent one end of the bar and conveying the same through the machine, and means for severing said bar.

29. In a candy molding machine the combination of means for molding the candy into form, means movable lengthwise of the molding means for feeding candy in the form of a bar thereto, means for grasping said candy adjacent an end and conveying it through the machine and means for severing said candy and grasping the severed end of the bar.

30. In a candy molding machine the combination of a member having molding devices provided thereon, vertical and horizontally movable molding devices arranged at the sides of said member and means for causing said member to alternately co-operate with said molding devices arranged at the sides of said member.

31. In a candy molding machine the combination of a pair of molding devices, including radially movable converging forming dies, a movable element arranged between said molding devices and being operable to successfully cooperate with said molding devices, said element being provided with means cooperating with said first mentioned molding devices to complete the same.

32. In a candy molding machine the combination of a plurality of molding devices, a feeding means operable lengthwise between the molding devices and an element operable with said devices to complete and form a part of said molding devices.

33. In a candy molding machine the combination of a plurality of molding devices and a movable element operable with said devices to complete and form a part of said molding devices, said molding devices, each including converging molding members, said element being provided with means for directing candy to said molding devices.

34. In a candy molding machine the combination of a plurality of molding devices, a member having means to direct the candy to be molded to the molding devices said member being movable to alternately cooperate with said devices, said member forming a part of said molding devices and said first mentioned molding devices being operable to converge toward each other to complete the mold.

35. In a candy molding machine the combination of a plurality of molding devices, means movable lengthwise of the molding devices for feeding candy to the molding devices, a member arranged to alternately cooperate with said devices, said member forming a part of said molding devices, and having means for directing the candy to said molding devices.

36. In a candy molding machine the combination of molding devices, a member movable out of cooperative relation with one of said molding devices and into cooperative relation to another molding device, said molding devices including a portion which is held stationary to receive the candy to be molded, said portion being operable by said movable member to eject the molded candy when said member is moved out of cooperative relation therewith.

37. In a candy molding machine the combination of molding devices, a member operable to form part of said molding devices, said member being movable into and out of cooperative relation and thereby cause the candy to be molded and ejected from the molding devices, said member having means operable to feed candy to be molded to one molding device during the ejecting operation of the other molding device.

38. In a candy molding machine the combination of molding devices, a member operable to form part of said molding devices, said member being movable into and out of cooperative relation and thereby cause the candy to be molded and ejected from the molding devices, said member having means operable to feed candy to be molded to one molding device during the ejecting operation of the other molding device, said means being operable upon the actuation of said member.

39. In a candy molding machine the combination of molding devices, a member operable to form part of said molding devices, said member being movable into and out of cooperative relation and thereby cause the candy to be molded and ejected from the molding devices, said member having means operable to feed candy to be molded to one molding device during the ejecting operation of the other molding device, said means having means to retain the candy to be molded in position to be fed to one molding device during the molding operation of the other molding device.

40. In a candy molding machine the combination of molding devices, a member operable to form part of said molding devices, said member being movable into and out of cooperative relation and thereby cause the candy to be molded and ejected from the molding devices, said member having means operable to feed candy to be molded to one molding device during the ejecting operation of the other molding device, said means being operable to retain the candy to be molded in position to be fed to one molding device during the molding operation of the other molding device, and to feed said candy to one molding device upon the ejecting operation of the other molding device.

In witness whereof, I hereunto subscribe my name this 16th day of April A. D., 1921.

THEODORE WELSAND.